(12) United States Patent
Buda et al.

(10) Patent No.: US 11,048,665 B2
(45) Date of Patent: Jun. 29, 2021

(54) DATA REPLICATION IN A DISTRIBUTED FILE SYSTEM

(71) Applicant: INTERNATIONAL BUSINESS MACHINES CORPORATION, Armonk, NY (US)

(72) Inventors: Teodora S. Buda, Dublin (IE); Hitham Ahmed Assem Aly Salama, Dublin (IE); Lei Xu, Dublin (IE); Patrick J. O'Sullivan, Dublin (IE); Christina Thorpe, Dublin (IE); Leandro Almeida, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 246 days.

(21) Appl. No.: 15/935,690

(22) Filed: Mar. 26, 2018

(65) Prior Publication Data
US 2019/0294701 A1 Sep. 26, 2019

(51) Int. Cl.
G06F 16/14 (2019.01)
G06F 16/182 (2019.01)
G06F 16/178 (2019.01)

(52) U.S. Cl.
CPC .......... *G06F 16/178* (2019.01); *G06F 16/148* (2019.01); *G06F 16/1844* (2019.01)

(58) Field of Classification Search
CPC combination set(s) only.
See application file for complete search history.

(56) References Cited

U.S. PATENT DOCUMENTS

| | | | | |
|---|---|---|---|---|
| 7,685,109 | B1 * | 3/2010 | Ransil | G06F 11/1446 707/999.003 |
| 9,507,844 | B2 * | 11/2016 | Blea | G06F 16/27 |
| 9,792,295 | B1 | 10/2017 | Rus | |
| 2011/0161294 | A1 | 6/2011 | Vengerov et al. | |
| 2013/0132408 | A1 * | 5/2013 | Little | G06F 16/2255 707/754 |
| 2016/0314147 | A1 | 10/2016 | Romine | |
| 2017/0169088 | A1 | 6/2017 | Hong et al. | |

* cited by examiner

*Primary Examiner* — Tuankhanh D Phan
(74) *Attorney, Agent, or Firm* — Griffiths & Seaton PLLC (57) ABSTRACT

Embodiments for data replication in a distributed file system environment by a processor. Data replication of one or more files that are more frequently used as compared to other files in a plurality of files may be increased according to hot data detected from one or more queries to a distributed file system.

17 Claims, 7 Drawing Sheets

DATA REPLICATION IN A DISTRIBUTED FILE SYSTEM

BACKGROUND OF THE INVENTION

Field of the Invention

The present invention relates in general to computing systems, and more particularly to, various embodiments for data replication in a distributed file system environment using one or more computing processors.

Description of the Related Art

In today's society, computer systems are commonplace. Computer systems may be found in the workplace, at home, or at school. Computer systems may include data storage systems, or disk storage systems, to process and store data. In recent years, both software and hardware technologies have experienced amazing advancement. With the new technology, more and more functions are added, and greater convenience is provided for use with these computing systems. The amount of information to be processed nowadays increases greatly. Therefore, processing and storing very large amounts of information is a key problem to solve.

SUMMARY OF THE INVENTION

Various embodiments for performing data replication in a distributed file system environment by a processor are provided. In one embodiment, by way of example only, a method for data replication in a distributed file system environment, again by a processor, is provided. Data replication of one or more files that are more frequently used as compared to other files in a plurality of files may be increased according to hot data detected from one or more queries to a distributed file system.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Big Data is a collection of tools, techniques, and operations used for data sets that become so voluminous and complex that traditional data processing applications are inadequate to store, query, analyze or process the data sets using current database management and data warehousing tools or traditional data processing applications. The challenges of handling big data include capturing data, storing data, analyzing data, searching data, sharing data, and visualization of the data.

For Big Data to function properly, Big Data may rely on several components, including a distributed file system, a job processing technology, or structured query using declarative languages. In order to achieve the required performance and scalability across large data sizes, it becomes essential to store the data in a structure that can deliver the required levels of performance and scalability. The storage structure may be a distributed cluster computing system (e.g., distributed storage system) so as to take advantage of the combined capacity of several computers (e.g., a few tens to several thousands of computers), and to be able to use ordinary, low-cost computers instead of costly dedicated high-capacity servers.

In one aspect, a distributed file system such as, for example, Hadoop file system ("HDFS"), may be used for a Big Data system such as, for example, Apache™ Hive™ Apache™ Impala™, Apache™ Spark™, and Apache™ Hadoop®), creating a dependency on all Big Data systems over the HDFS. HDFS does suffer from performance efficiency, which is reflected in the performance of all the tools placed on top of the HDFS. Since these Big Data systems depend on this distributed file storage structure (HDFS), a need exists for advancements and optimizations at this layer of the architecture so as to offer increased computing efficiency and performance gains to all application tools placed on the HDFS. Simply stated, because big data tools rely on a distributed file system (HDFS), a need exists to provide a solution that optimizes the performance of the distributed file system without being limited to any specific big data system.

Accordingly, various embodiments are provided herein that are directed to an application tool that increases the performance of a distributed file system (e.g., an HDFS) for Big Data applications (e.g., Apache™ Spark™, and Apache™ Hadoop®) without interfering with the internal operation of the file system itself. In this way, the present invention prevents recoding the file system and allows the application tool to be installed in any computing system environment. The increase in performance and computing efficiency may be obtained from information of queries in the application layer, using a structure query language ("SQL") in a data warehouse application. Using this information, the present invention is adaptive, regarding the use of data.

In one aspect, the mechanisms of the illustrated embodiments increase the performance of a distributed file system (e.g., an HDFS) by increasing the replication of the most frequently used files, in an adaptive way, based on the detection of "hot data" by analyzing and learning from the most common queries that are executed, which is performed without any changes to the internal mechanisms of the distributed file system, allowing the present invention to be used in any existing or future installations without the need for adaptations, as well as allowing the use in different types of distributed file systems. One or more data partitioning strategies may be suggested and selected so as to increase data replication efficiency on the hot data. In one aspect, "hot data" may be data that is frequently accessed for read or write access. Cold data may be less frequently accessed (as compared to hot data).

In an additional aspect, various embodiments provide a solution for performing data replication in a distributed file system environment. Data replication of one or more files that are more frequently used as compared to other files in a plurality of files may be increased according to hot data detected from one or more queries to a distributed file system such as, for example, an RDFS. That is, data replication is increased for files as having activity greater than a predetermined threshold (e.g., hot data) detected and/or identified from one or more queries to a distributed file system.

More specifically, an application sensor may be connected externally to a distributed file system (e.g., HDFS) and to a data warehouse application (e.g., Apache™ Hive™). The application sensor may collect information about one or more executed queries and file usage. An adaptive agent, associated with the application sensor, may analyze the queries, generate various reports such as, for example, usage reports, and classify data as "hot data." The adaptive agent may also decide which specific files are to increase in a number of data replications according to the hot data.

It is understood in advance that although this disclosure includes a detailed description on cloud computing, implementation of the teachings recited herein are not limited to a cloud-computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
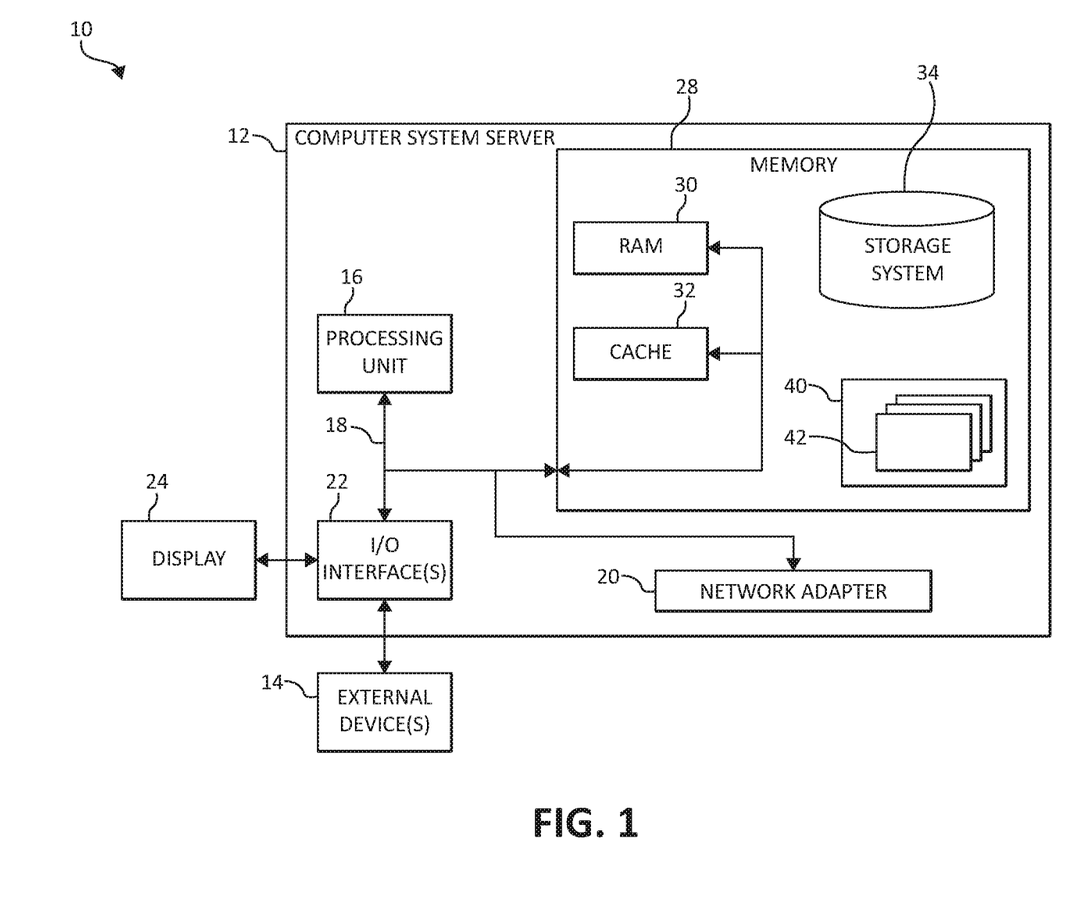
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 12.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
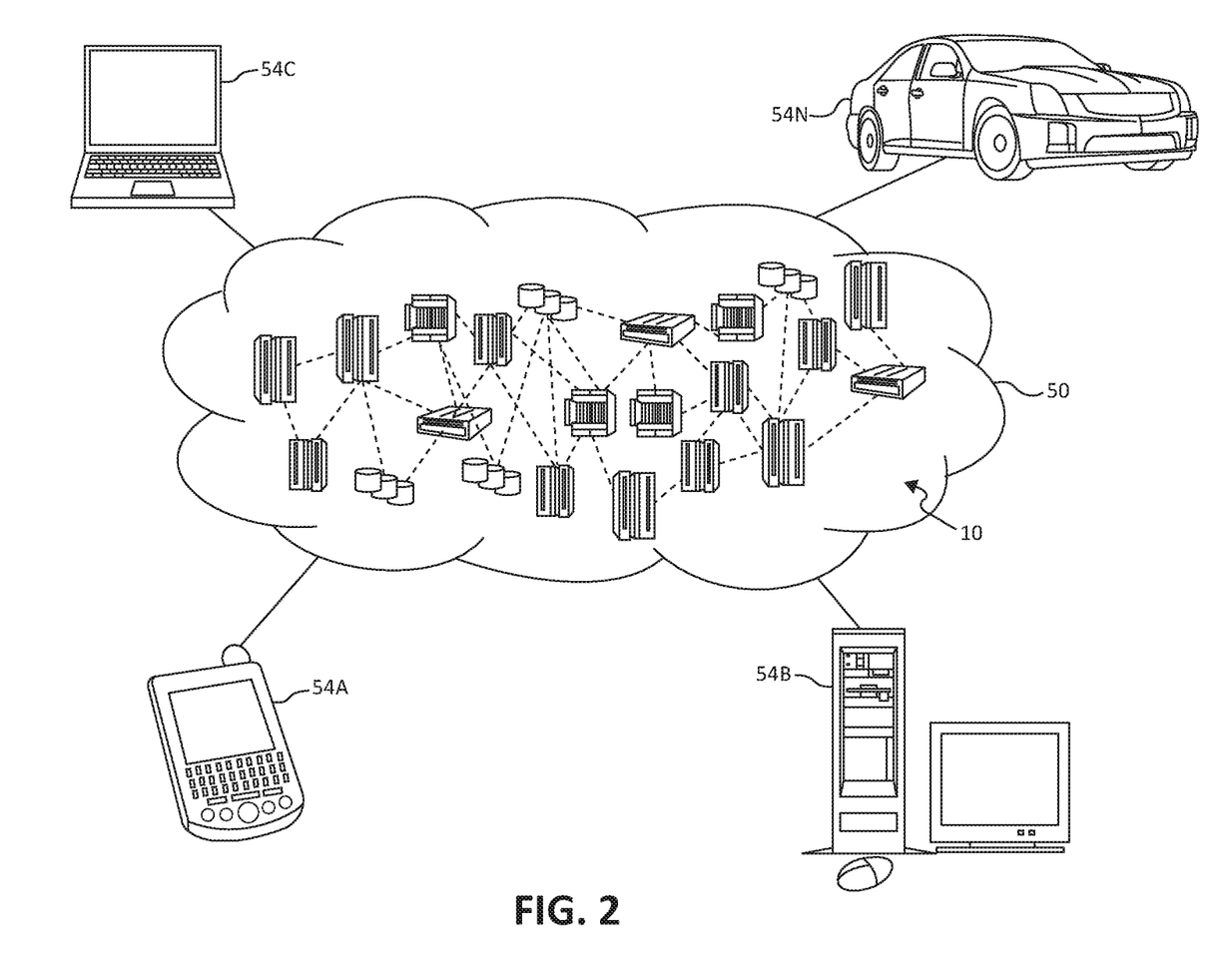
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
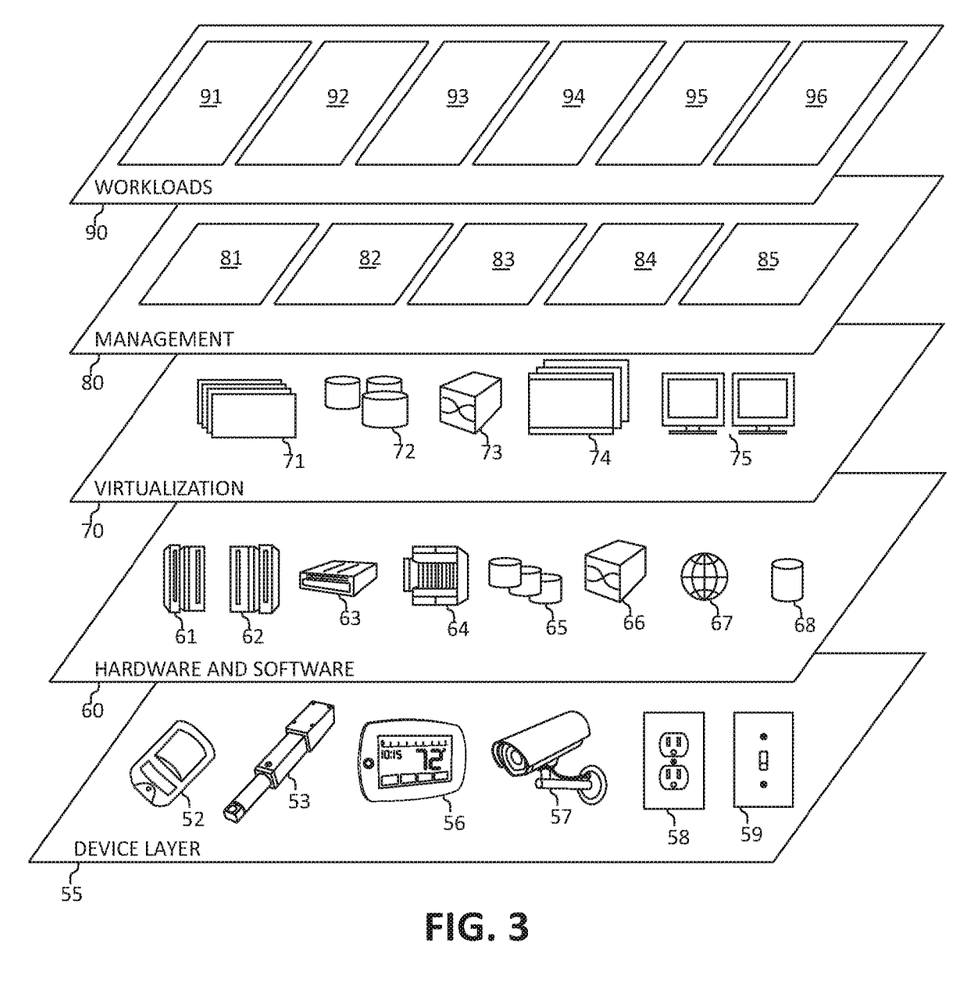
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various consistent data replication workloads and functions 96. In addition, data replication workloads and functions 96 may include such operations as data analytics, data analysis, and as will be further described, notification functionality. One of ordinary skill in the art will appreciate that the consistent data replication workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
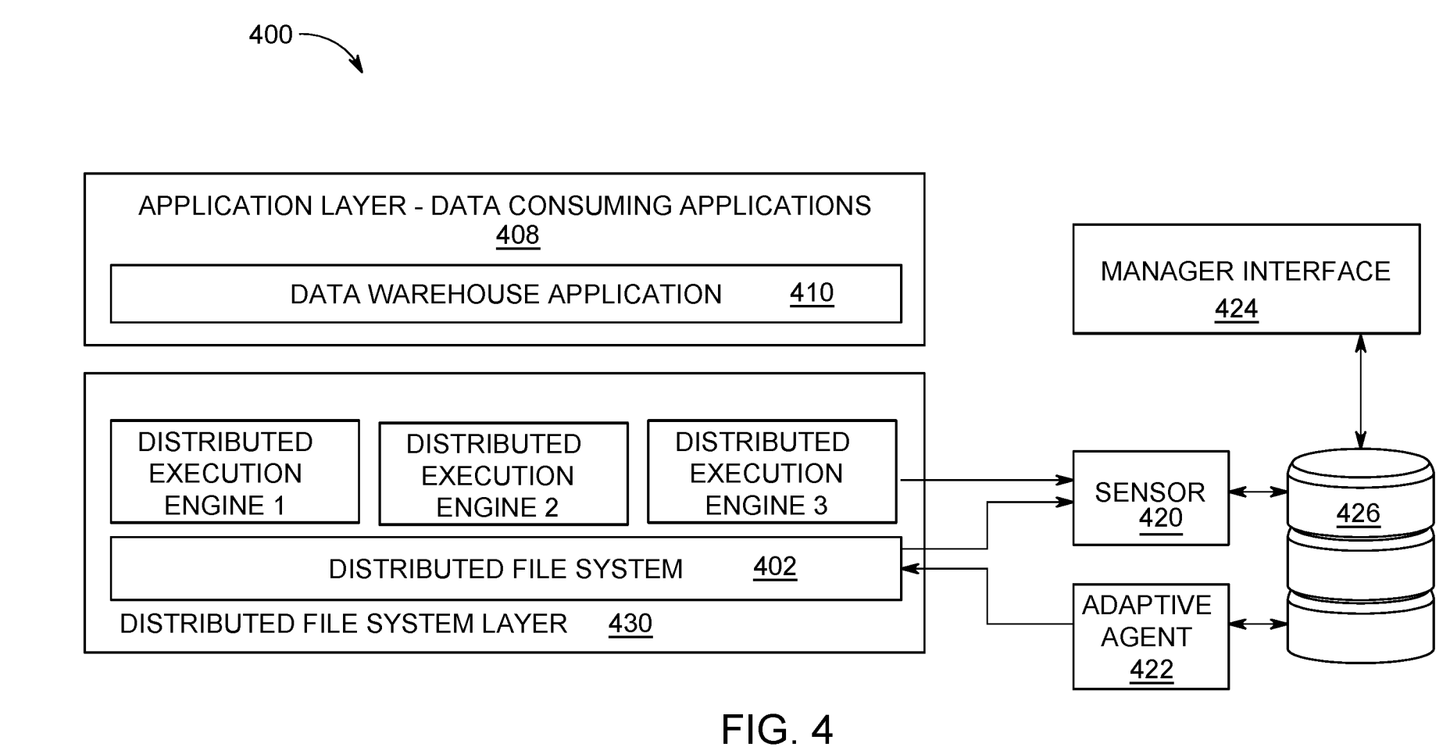
FIG. 4 is an additional block diagram depicting various user hardware and computing components functioning in accordance with aspects of the present invention.

Turning to FIG. 4, a block diagram of a distributed computing cluster 400 equipped with various functionality as will be further described is shown in which aspects of the mechanisms of the illustrated embodiments may be realized. In one aspect, one or more of the components, modules, services, applications, and/or functions described in FIGS. 1-3 may be used in FIG. 4. For example, computer system/server 12 of FIG. 1 may be included in FIG. 4 and may be connected to other computing nodes (such as computer systems of vehicles) over a distributed computing network, where additional data collection, processing, analytics, and other functionality may be realized. The components of computer system/server 12 may include, but are not limited to, one or more processors or processing units 16, a system memory 28, and a bus 18 that couples various system components including system memory 28 to processor 16.

The distributed computing cluster 400 may include, at a distributed file system layer (e.g., Hadoop layer) 430, a distributed file system 402 (e.g., HDFS), distributed execution engine 1 (e.g., Apache Spark™), distributed execution engine 2 (e.g., Google® MapReduce™), and distributed execution engine 3 (e.g., Apache Spark™), and an application layer 408. The application layer 408 may include a data warehouse application 410 (e.g., Apache™ Hive™).

In one aspect, the distributed computing cluster 400 includes an application sensor 420 (or "sensor"), an adaptive agent 422, a manager interface 424, and database 426 that may also be associated with the distributed file system 402. The application sensor 420, the adaptive agent 422, the manager interface 424, and the database 426 may be externally located from the distributed file system 402.

In one aspect, the distributed computing cluster 400 is characterized by having the distributed file system 402 as a base platform (e.g., the distributed file system layer 430). One or more job processing engines, such as distributed execution engine 1 (e.g., Apache Spark™) distributed execution engine 2 (e.g., Google® MapReduce™), and distributed execution engine 3 (e.g., Apache Spark™) may be implemented on the distributed file system 402. At a top layer (e.g., an application layer 408), the distributed computing cluster 400 runs the data warehouse application 410 (e.g., Apache™ Hive™) or database management application that supports queries through a declarative language such as, for example, Apache™ Hive™ using an SQL dialect. The top-tier data warehouse application 410 in the application layer 408 may partition data space through one or more public application programming interfaces (APIs).

It should be noted that distributed computing cluster 400 may be applied to any distributed file system (e.g., HDFS), as long as the distributed computing cluster 400 allows replication that can be used through external APIs and/or commands and can also be applied to any query application as long as the distributed computing cluster 400 allows the partitioning of the data space.

In one aspect, the application sensor 420 connects to the distributed file system 402 and data warehouse application 410 (e.g., Apache™ Hive™). The application sensor 420 detects the most used files as compared to a plurality of other files in the distributed file system 402, as well as detecting which portions of the data are most used by each one of the queries. That application sensor 420 detects the hot data in the files based on information collected from each one of the queries sent to each of the various applications running on the distributed file system 402. The detection of the hot data may also be applied to other available applications that use queries based on declarative languages such as, for example, SQL.

The application sensor 420 looks for and detects information about the execution of one or more queries (intended for the distributed filed system 402) and about the use of the files in the distributed file system 402. In addition, the application sensor 420 collects data about the distributed filed system 402 (e.g., distributed computing cluster) itself, such as, for example, cluster usage information, a number of active nodes, the average time to execute the same task on different nodes, the number of nodes used in each phase of each job, available storage space, a network state, the architecture of the network, and data read speed. This information may be stored in database 426 for historical comparisons and analysis. The stored data may be used to determine the "hot data" of the files in the distributed filed system 402.

The cluster usage information may also be used to identify one or more time windows (e.g., every day) where the distributed computer cluster is least used so that the operations performed by the adaptive agent do not dispute the use of the network and storage of the distributed file system 402 with the jobs being executed. By checking the history of queries executed, two main pieces of information/data are collected: 1) which fields are most frequent in the queries filters, and 2) which ranges of values are most used in these filters. This information may be used to suggest a data partitioning strategy to separate the data partitions that contain "hot data" into different files, in order to increase the replication (and the performance, therefore) of only that data.

The adaptive agent 422 may be connected to a manager of the distributed file system 402 via the manager interface 424. The adaptive agent 422, which is an external agent to the distributed file system 402, may direct the distributed file system 402 (e.g., HDFS or other distributed file system) to replicate the most used files in a greater number of nodes (the optimal and maximum number of useful nodes). With this information, the system can suggest data partitioning strategies to the data warehouse application (Hive, for instance), in order to isolate the "hot data" in a separate partition.

In one aspect, the adaptive agent 424 may make one or more changes to replication factors of each of the files containing in the hot data. From the information collected by the application sensor 420, the adaptive agent 422 may generate usage reports (e.g., cluster usage reports), based on a classification of hot data. The adaptive agent 422 may analyze, over a selected period of time, those files that are most used for the various jobs sent, the frequency of sending the jobs, and the time used for each execution. This information may be used by the adaptive agent 422 to decide which specific files include hot data and should have their replication increased. In one aspect, only the files of the most used partitions (e.g., the hot data) will have their replication increased.

The adaptive agent 422 may also use information about the distributed filed system 402 (e.g., distributed computing cluster) itself so as to know a maximum possible replication factor and to estimate the performance gain of various Big Data applications. Using all available information, the adaptive agent 422 creates a list of which files are considered as "hot data," and determines a validity time period for this evaluation (e.g., a default time period of 5 days).

In one aspect, the replication of files considered as hot data may be larger in scale in relation to the maximum hot data determined by the data obtained from the sensor. That is, there is a maximum efficient size for the hot data (e.g., for a specific file based on a block size, and previous executed jobs) and there is a limit for the number of replicas to be created. Above the limit of number of replicas to be created, there is no predicted gain in performance. So, there is a point when the scale of the replicas of files can be larger than the maximum limit determined by the sensor. Thus, for each file, a "maximum" number of replicas can be different, due to the size of the block configured in the file system, the maximum number of workers estimated for the previously executed jobs, or for the maximum number of nodes in the cluster.

In one aspect, the increased data replication operation may execute on low-utilization windows of the distributed computer cluster determined by the application sensor 420. The reason for the increased data replication operations executing on low-utilization windows is because the replication procedure can be relatively slow, depending on network and cluster conditions and the replication procedure copies a block of data from one node to another. Thus, to avoid any conflicts with running jobs (e.g., operations) in the cluster, the low-utilization window(s) may be activated or executed in moments when the distributed computer cluster is not used, or with low usage such as, for example, the usage of the distributed computer cluster is less than a predefined threshold. In short, "low-utilization window" may refer to a period of time when the distributed computer cluster has less work to do than on average. Said differently, "low-utilization window" may refer to a period of time when the distributed computer cluster usage is below a usage threshold.

If no window is identified, the increased data replication of the hot data may be performed when the selected number of files having the hot data are not being used and may be executed in "steps of two" with the average time of execution of a job between each increment. It should be noted that the execution in steps of two means that if the cluster does not have any low-utilization window, the file blocks can be replicated (e.g., copied) two at a time, and then after waiting for a selected time period (average execution time), replicate another two file blocks until reaching the end of the blocks to be replicated. The replication of file blocks in steps of two minimizes conflicts with any running processes.

For each file in the distributed file system 402 having increased replication, a timer may be started to verify the validity of increasing the data replication by at least the end of a selected time period (e.g., increase the number of data replications of the hot data within a default value of 5 days). If the file with hot data continues to be among the most used files in this list, the adaptive agent 422 may maintain a highest replication value for the file. If the file with hot data eventually becomes a file with cold data and/or is not in the most used files, the data replication value for this now "cold data" file is returned to a default replication value of the distributed computer cluster.

Figure 5:
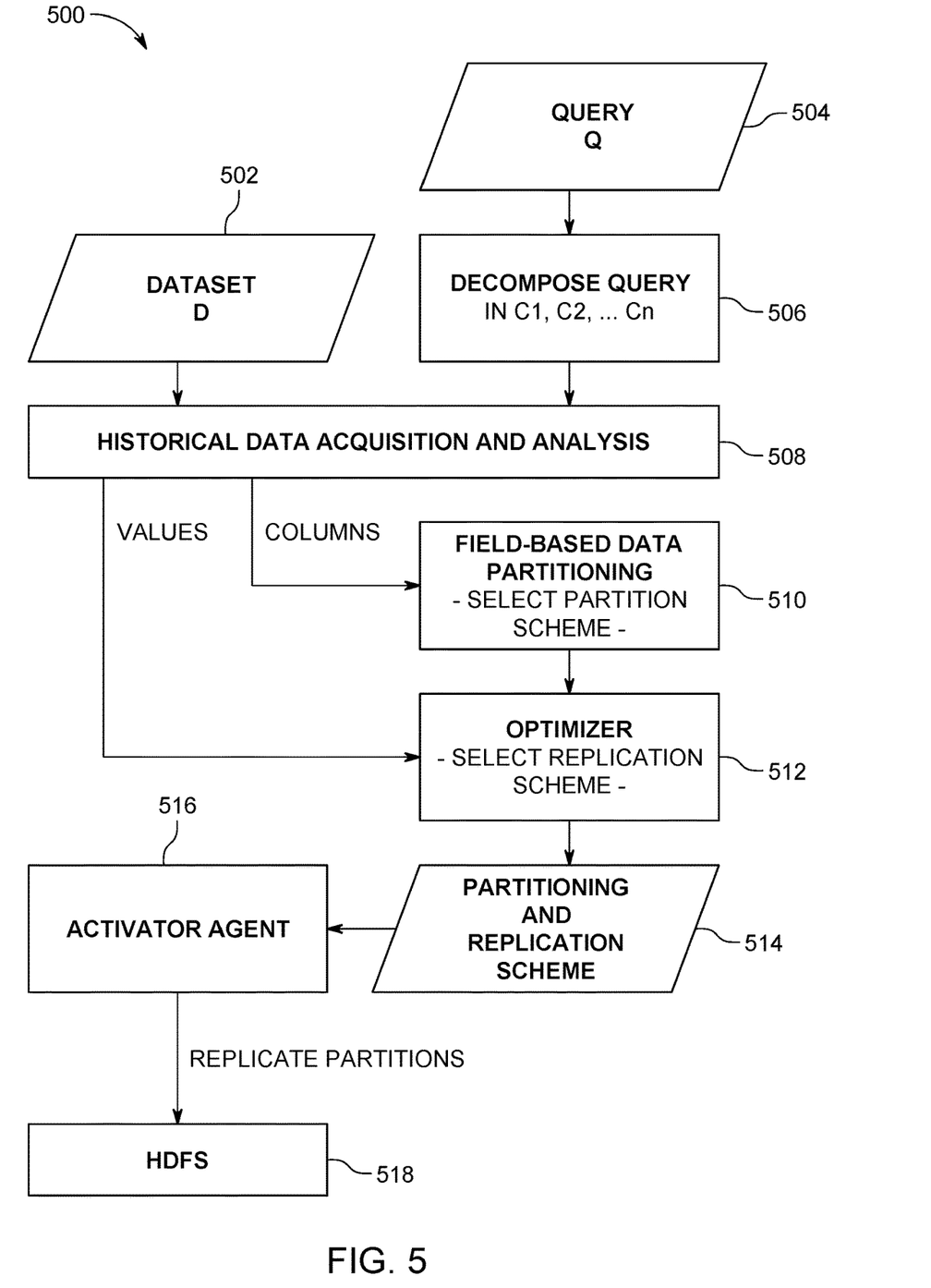
FIG. 5 is a flowchart diagram depicting an additional exemplary method for data replication in a distributed file system environment by a processor, again in which aspects of the present invention may be realized.

FIG. 5 is a flowchart diagram depicting an exemplary method for data replication in a distributed file system environment. In one aspect, one or more of the components, modules, services, applications, and/or functions described in FIGS. 1-4 may be used in FIG. 5. For example, computer system/server 12 of FIG. 1 and the application sensor 420, the adaptive agent 422, the manager interface 424, and the database 426 may be included in FIG. 5 and may be connected to other computing nodes over a distributed computing cluster, where additional data collection, processing, analytics, and other functionality may be realized. The functionality 500 may be implemented as a method executed as instructions on a machine, where the instructions are included on at least one computer readable medium or one non-transitory machine-readable storage medium.

The functionality 500 may start in block 502. One or more queries 504 (e.g., an SQL query) may be captured and decomposed (e.g., C1, C2, . . . , Cn) into a collection of information such as, for example, terms relating to the one or more files. The queries may be captured in a data warehouse application. That is, all queries sent to the data warehouse application are captured either from a database driver interception (e.g., a JDBC driver) or from the analysis of the application logs.

Also, the queries may be decomposed by extracting which parts of the data that pertain to the query. The terms may be from one or more fields in query filters and ranges of values within the query filters. Only the terms of the most relevant queries for the distributed computing cluster system are decomposed for later analysis.

In block 508, an analysis operation may be performed to determine which files (and data) are related to the queries using the decomposed queries, from block 506, and historical data acquisition from a dataset 502. For example, the analysis of the queries history is performed to determine which fields should be the partition vectors in the data space. Only the most frequently used fields and ranges of values are analyzed and any degrees of aggregation and decomposition existing between the fields of these filters are analyzed. In one aspect, analyzing the one or more queries and historical queries may utilize a machine learning operation for predicting which columns and values will remain frequent for a subsequent period of time (e.g., the future).

From block 508, one or more columns (portions of the information that are being collected such as, for example, name, age, employees, etc.) and one or more values, from the columns, may be extracted from the queries and the data may be partitioned according to the extracted columns (e.g., field-based data partitioning) and a partition strategy (e.g., scheme) may be selected, as in block 510.

For example, from the analysis of the main fields and ranges of values found in the queries, one or more partitioning possibilities and strategies that are most advantageous, in general, may be analyzed for the distributed computing cluster system. In one aspect, the suggested partitioning strategy that is performed may be more favorable to a particular set of queries over others. However, the distributed computing cluster system may attempt to identify and find the strategy that seeks to increase the performance of as many queries as possible. The functionality 500 at block 510 may move to block 512.

As stated (and also from block 508), one or more values, from the columns, may be extracted and an optimizing operation (e.g., an optimizer) may select an optimized data replication strategy (e.g., a best replication scheme or strategy) for increasing the data replication of the hot data according to the columns and values that are extracted, as in block 512. The hot data of the file may be partitioned and the replication strategy may replicate the partitioned hot data, as in block 514. An activator agent (e.g., an "optimization agent") may receive the data partitioning strategy and the data replication strategy, as in block 516. The activator agent may select the files of the partitions to be replicated in a larger degree or number of times. The data partitions of the hot data may be replicated (in a maximum or optimal number of nodes in the distributed computing cluster), as in block 518.

By analyzing which partitioning strategy is selected, the system will increase the replication of the most commonly used data portion within the partition. The partitioning of hot data allows the separation of files with hot data (e.g., most used files) in different files and/or directories, so as to allow that information to be separated, and can be made more available for increased replication. The functionality 500 may end, as in block 518.

Figure 6:
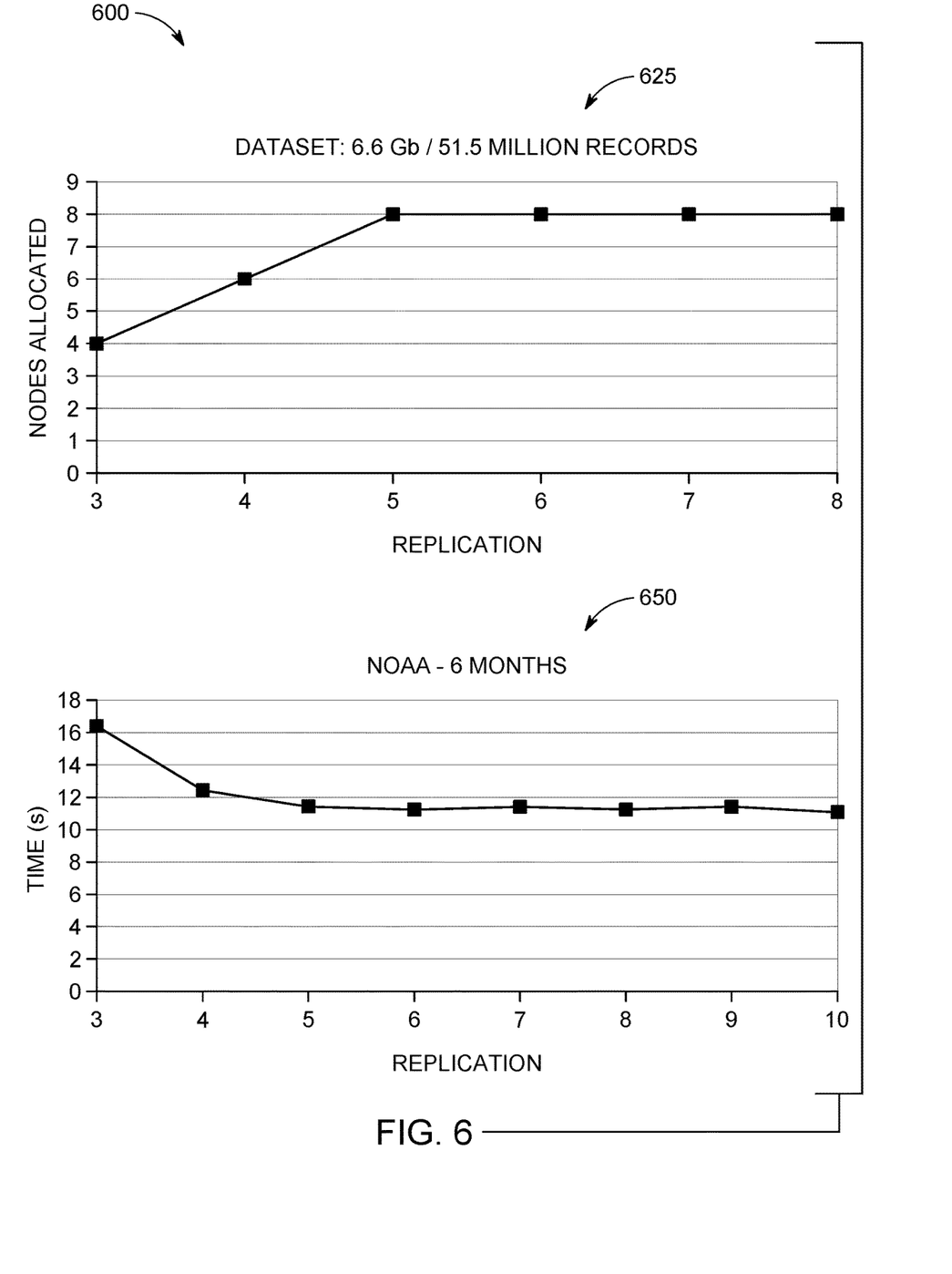
FIG. 6 is a graph diagram depicting results from data replication in a distributed file system environment in accordance with aspects of the present invention.

Turning now to FIG. 6, a graph diagram 600 depicts results from data replication in a distributed file system environment in accordance with aspects of the present invention. In one aspect, one or more of the components, modules, services, applications, and/or functions described in FIGS. 1-5 may be used in FIG. 6. Graph 625 illustrates the usage of cluster nodes to resolve a query in terms of numbers of persons and graph 650 illustrates the results of improved performance from increased replication.

As illustrated in graphs 625, 650, the tests illustrate a performance gain when data is replicated in a greater (or larger) number of the data partitions that are most used for a given query, using a distributed file system such as, for example, Hadoop file system ("HDFS"), and the data warehouse application (e.g., Apache™ Hive™ running on a MapReduce™ engine). As illustrated from graph 625 of FIG. 6, upon increasing the number of replicas of a particular file used in a job, the number of nodes allocated by the HDFS may also increase thereby allowing more computational resources to be used to process that specific job.

As depicted in graph 650, one or more tests were run on an 11-node cluster, using real atmospheric data from National Oceanic and Atmospheric Administration ("NOAA"). As depicted in graph 650, query performance is increased when the replication factor of the files increases for a query. That is, as the number of replications is increased for the file (e.g., from 3 to 10), there is a decrease in the amount of time (e.g., 16 to 11.5) required for executing a query, which thereby increases computing efficiency or query performance. Said differently, the Y-axis represents the time ("Time(s)") consumed for a job (e.g., replication) execution and the X-axis represents the number of replications. Thus, when the time for executing a job is diminishing, the performance is actually increasing. The time to execute each query is also decreasing and thus the performance of query execution is increasing.

Figure 7:
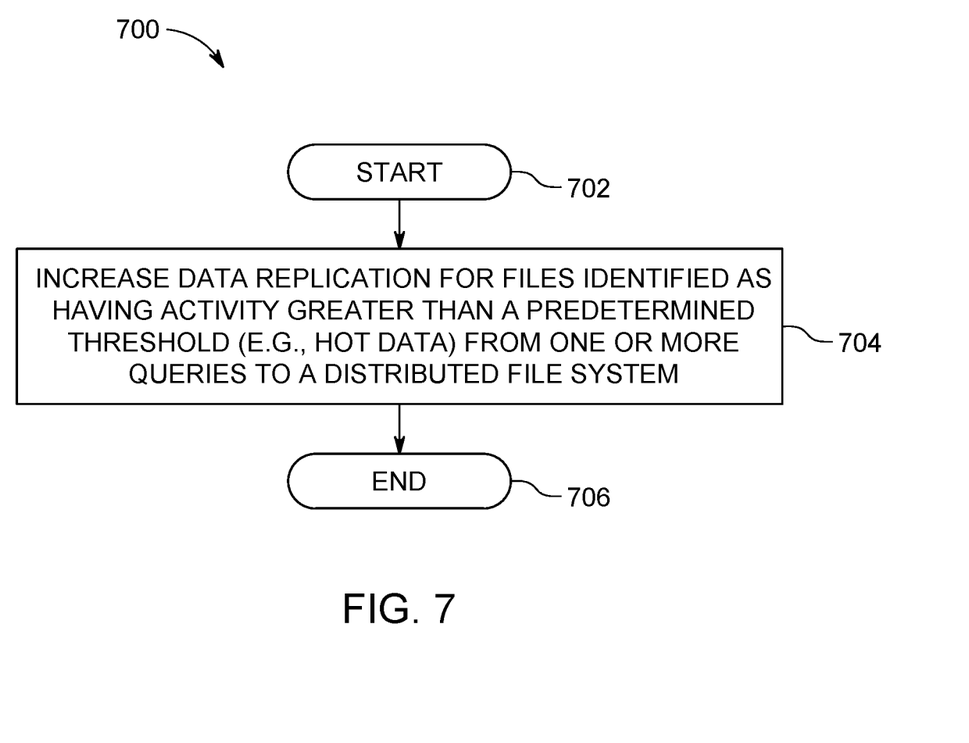
FIG. 7 is a flowchart diagram depicting an exemplary method for data replication in a distributed file system environment by a processor, again in which aspects of the present invention may be realized.

FIG. 7 is a flowchart diagram depicting an exemplary method for data replication in a distributed file system environment. The functionality 700 may be implemented as a method executed as instructions on a machine, where the instructions are included on at least one computer readable medium or one non-transitory machine-readable storage medium. The functionality 700 may start in block 702. Data replication is increased for files identified as having activity greater than a predetermined threshold (e.g., hot data) from one or more queries to a distributed file system, as in block 704. Said differently, data replication of one or more files that are more frequently used as compared to other files in a plurality of files may be increased according to hot data detected from one or more queries. The functionality 700 may end, as in block 706.

In one aspect, in conjunction with and/or as part of at least one block of FIG. 7, the operations of method 700 may include each of the following. The operations of method 700 may monitor usage of each of the plurality of files and the one or more queries received by the distributed file system, analyze the one or more queries and historical queries to identify those of the plurality of files having activity greater than a predetermined threshold (e.g., to detect files with hot data), and detect those of the plurality of files having activity greater than the predetermined threshold using an application sensor (e.g., application sensor detects files having hot data).

Additionally, the operations of method 700 may decompose the one or more queries into terms relating to the one or more files, wherein the terms are from one or more fields in query filters and ranges of values within the query filters and/or select one or more data partitioning strategies to separate data partitions into different files for those of the plurality of files having activity greater than the predetermined threshold. That is, one or more data partitioning strategies may be used to separate data partitions containing the hot data into different files. The operations of method 700 may replicate those of the plurality of files having activity greater than the predetermined threshold in a maximum number of nodes (e.g., replicate the one or more files containing the hot data in a maximum number of nodes).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for data replication in a distributed file system environment, comprising:
   storing a plurality of files in a distributed file system having data stored on a plurality of distributed nodes;
   receiving one or more queries to the plurality of files, wherein the one or more queries comprise structured query language (SQL) queries;
   decomposing the one or more queries to the plurality of files into terms relating to the plurality of files, wherein the terms are from one or more fields in query filters and ranges of values within the query filters; and
   increasing data replication of an identified those of the plurality of files having activity greater than a predetermined threshold detected from the one or more queries, wherein the activity greater than the predetermined threshold is defined as identifying those of the plurality of files having been accessed over the predetermined threshold during an observed time window by determining which of the one or more fields in the query filters are most frequently searched and which of the ranges of values within the query filters are most frequently used.

2. The method of claim 1, further including monitoring usage of each of the plurality of files and the one or more queries received by the distributed file system.

3. The method of claim 1, further including analyzing the one or more queries and historical queries to identify those of the plurality of files having activity greater than the predetermined threshold.

4. The method of claim 1, further including detecting those of the plurality of files having activity greater than the predetermined threshold using an application sensor.

5. The method of claim 1, further including selecting one or more data partitioning strategies to separate data partitions into different files for those of the plurality of files having activity greater than the predetermined threshold.

6. The method of claim 1, further including replicating those of the plurality of files having activity greater than the predetermined threshold in a maximum number of nodes.

7. A system for data replication in a distributed file system environment, comprising:
   one or more computers with executable instructions that when executed cause the system to:
      store a plurality of files in a distributed file system having data stored on a plurality of distributed nodes;
      receive one or more queries to the plurality of files, wherein the one or more queries comprise structured query language (SQL) queries;
      decompose the one or more queries to the plurality of files into terms relating to the plurality of files, wherein the terms are from one or more fields in query filters and ranges of values within the query filters; and
      increase data replication of an identified those of the plurality of files having activity greater than a predetermined threshold detected from the one or more queries, wherein the activity greater than the predetermined threshold is defined as identifying those of the plurality of files having been accessed over the predetermined threshold during an observed time window by determining which of the one or more fields in the query filters are most frequently searched and which of the ranges of values within the query filters are most frequently used.

8. The system of claim 7, wherein the executable instructions that when executed cause the system to monitor usage of each of the plurality of files and the one or more queries received by the distributed file system.

9. The system of claim 7, wherein the executable instructions that when executed cause the system to analyze the one or more queries and historical queries to identify those of the plurality of files having activity greater than the predetermined threshold.

10. The system of claim 7, wherein the executable instructions that when executed cause the system to detect those of the plurality of files having activity greater than the predetermined threshold using an application sensor.

11. The system of claim 7, wherein the executable instructions that when executed cause the system to select one or more data partitioning strategies to separate data partitions into different files for those of the plurality of files having activity greater than the predetermined threshold.

12. The system of claim 7, wherein the executable instructions that when executed cause the system to replicate those of the plurality of files having activity greater than the predetermined threshold in a maximum number of nodes.

13. A computer program product for, by a processor, data replication in a distributed file system environment, the computer program product comprising a non-transitory computer-readable storage medium having computer-readable program code portions stored therein, the computer-readable program code portions comprising:
   an executable portion that stores a plurality of files in a distributed file system having data stored on a plurality of distributed nodes;
   an executable portion that receives one or more queries to the plurality of files, wherein the one or more queries comprise structured query language (SQL) queries;
   an executable portion that decomposes the one or more queries to the plurality of files into terms relating to the plurality of files, wherein the terms are from one or more fields in query filters and ranges of values within the query filters; and
   an executable portion that increases data replication of an identified those of the plurality of files having activity greater than a predetermined threshold detected from the one or more queries, wherein the activity greater than the predetermined threshold is defined as identifying those of the plurality of files having been accessed over the predetermined threshold during an observed time window by determining which of the one or more fields in the query filters are most frequently searched and which of the ranges of values within the query filters are most frequently used.

14. The computer program product of claim 13, further including an executable portion that monitors usage of each of the plurality of files and the one or more queries received by the distributed file system.

15. The computer program product of claim 13, further including an executable portion that analyzes the one or more queries and historical queries to identify those of the plurality of files having activity greater than the predetermined threshold.

16. The computer program product of claim 13, further including an executable portion that detects those of the plurality of files having activity greater than the predetermined threshold using an application sensor.

17. The computer program product of claim 13, further including an executable portion that:
   selects one or more data partitioning strategies to separate data partitions into different files for those of the plurality of files having activity greater than the predetermined threshold; and
   replicates those of the plurality of files having activity greater than the predetermined threshold in a maximum number of nodes.

\* \* \* \* \*